Figure 1:
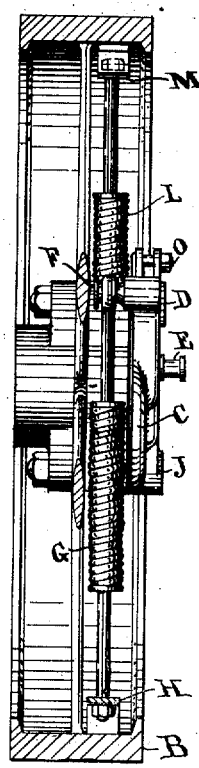

D. W. PAYNE.

ENGINE GOVERNOR.

APPLICATION FILED JAN. 13, 1908.

Reissued Jan. 11, 1910.

13,075.

WITNESSES:

A. S. Diven

M. E. Verbeck.

INVENTOR

David W. Payne

BY

Eugene Diven

ATTORNEY

UNITED STATES PATENT OFFICE.

DAVID W. PAYNE, OF ELMIRA, NEW YORK, ASSIGNOR, BY MESNE ASSIGNMENTS, TO THE D. W. PAYNE CONTROLLER & ENGINEERING COMPANY, OF NEW YORK, N. Y.

ENGINE-GOVERNOR.

13,075. Specification of Reissued Letters Patent. Reissued Jan. 11, 1910.

Original No. 735,408, dated August 4, 1903, Serial No. 79,938. Application for reissue filed January 13, 1908. Serial No. 410,703.

*To all whom it may concern:*

Be it known that I, DAVID W. PAYNE, a citizen of the United States, residing at Elmira, in the county of Chemung and State of New York, have invented certain new and useful Improvements in Engine-Governors, of which the following is a specification.

My invention relates to centrifugal governors or regulators for steam or other fluid pressure engines of that class which are affixed to the fly-wheel or crank-shaft of the engine, or to a shaft rotated thereby, and which effect the regulation of the engine-valve by varying the position of a loose or adjustable eccentric or eccentric-pin to which the valve-rod is connected; and the invention relates more particularly to the type of governor wherein the centrifugal and inertia efforts of the weights are utilized to secure isochronous regulation.

The object of my invention is to provide a governor of this type which may be readily adjusted to any required degree of isochronism and which shall be rendered more stable and at the same time more quick to respond to variations in load, being both sensitive and certain in action.

To this end my invention consists in concentrating the centrifugal and inertia weights about common centers of gravity and so connecting the centripetal springs to the weight-arms that the moments of the efforts of the springs shall be made to decrease with increasing lever arms as the weights approach the center of rotation, and vice versa, and also in so locating the weights with reference to their centers of suspension and the center of rotation that the components of centrifugal force perpendicular to lines drawn through the center of suspension and the center of gravity of the weights in the several positions will increase as the weights pass from their inner to their outer positions.

My governor also differs from those of ordinary construction in that the relation subsisting between the centrifugal and inertia efforts is such that the centrifugal effort unaided by that of the inertia is sufficient to balance the resistance of the springs and working parts at normal speed and the effort of inertia becomes operative only when there is a tendency to depart from that speed, at which time the inertia supplements the centrifugal effort.

In the usual construction of inertia governors the centrifugal and inertia weights are separate and either integrally united or connected one with the other by links. Where the two weights are thus connected, the inertia weight is so positioned relative to the center of suspension that the centrifugal effort of the weight will be absorbed by the suspension-pin, and it is held to be inoperative centrifugally as regards the centrifugal weight. As a matter of fact this is not so, since, the two weights being connected together, the centrifugal effort of the mass will act at the center of gravity of the combined parts, which is located somewhere on a line joining the centers of gravity of the two weights and at a distance from the center of gravity of the centrifugal weight inversely proportional to the two weights. The centrifugal effort of the mass then is greater or less than that of the centrifugal weight alone, according as the center of gravity of the mass is at a greater or less distance from the center of rotation than the center of gravity of the centrifugal weight. If the two weights be concentrated in one, then the centrifugal effort will be determined by the position of the center of gravity of but one weight undisturbed by any supplemental weight, while the inertia effort will be the same as before for equal radii. In carrying out my invention the center of gravity of the weight should be so located with reference to the centers of suspension and rotation that the component of the centrifugal effort tending to cause rotation about the center of suspension shall be at a maximum at the extreme outward position of the weight. With a single weight and spring the system will fulfil the conditions of my invention, but will be out of gravity balance. To obviate this difficulty, another weight of the same mass and same moment of inertia is therefore introduced and connected to the first by a link or links so positioned that the center of gravity of the entire system will be located at the center of rotation, or approximately so, in order that gravity balance may be established in all positions of the weights. In this construction the centrifugal and inertia efforts act in the same direction, the latter always supplementing the former when there is a departure from normal speed and the former alone being operative when the speed is normal. The point of attachment of the springs and the direction of their efforts are also of the first importance. In the usual construction the direction of the efforts of the springs is in lines tangent to the arcs of rotation of the points of attachment about the center of suspension when the system is in mid-position. By advancing the points where the springs are attached to the rim of the wheel or governor casing in the direction of rotation and by giving the springs proper initial tension, which is dependent upon their extension, the moments of the efforts of the springs may be made to decrease less rapidly than the centrifugal moments, as the weights move toward the center of rotation, due to an increase in the load or any other tendency causing reduced speed. By thus adjusting the points of spring attachment the governor will be caused to respond more quickly to changes of load or speed, and the adjustment may be such as to maintain constant speed up to the full capacity of the engine; or the engine may even be made to run faster with a load than without.

I attain the object of my invention by the construction and arrangement of the several parts of the governor, as illustrated in the accompanying drawings, in which—

Figure 2:
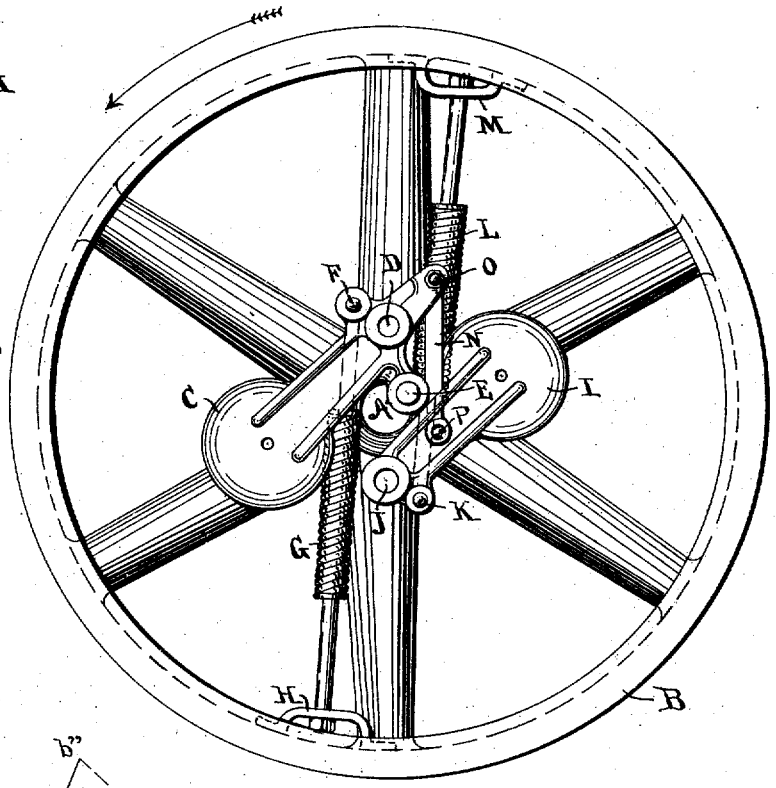
Figure 3:
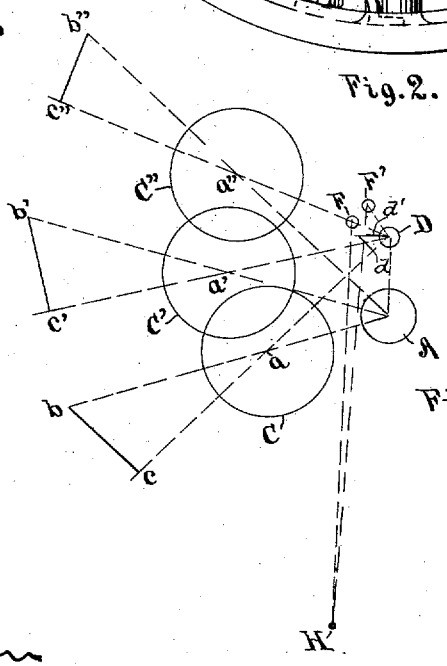

Figure 1 is a vertical section, and Fig. 2 a side elevation, of my governor; and Fig. 3, a diagram illustrating the principles under which the governor operates.

Similar letters refer to like parts in the several views.

A represents the engine-shaft or the auxiliary shaft to which the fly-wheel or governor casing B is attached.

C and I are the governor weights, hung by suitable arms to the suspension-pins D and J, respectively, which are spaced a suitable distance from the center of rotation A. The arm of the weight C also carries the pin E or an eccentric, to which the valve connection is coupled and which is made to approach or recede from the center A, according to the position of the weight C, thereby regulating the stroke of the valve. The centripetal spring G for the weight C is attached at one end to a pin F, secured to the arm of the weight, and at the other end to a hanger H, fastened to the rim of the casing B. It will be noticed that the angle which the radius DF makes with the medial line FH of the spring is an acute angle and that as the weight C is thrown out this angle will become more acute. It will be further noticed that the angle which the radius DF makes with the line DA joining the centers of suspension and rotation is an obtuse angle. To the arm of the weight I at K is attached a similar centripetal spring L, the other end of which is fastened to the hanger M, and the two weights are connected by the link N, coupled thereto at the points O and P. If we leave out of consideration the link N and its connections to the weights C and I and the valve-rod pin E, it will be seen that the two weights and their arms, if equal in other respects, will balance each other on opposite sides of the shaft A and that the center of gravity of the system will lie midway in the line connecting the centers of gravity of the weights C and I, or at the center of rotation. The unbalancing of the system by reason of the link N and pin E may be provided for by suitably proportioning weights C and I, or by the use of a second link between the weights in a diametrically opposite position to that of link N. The direction of rotation of the governor is indicated by the arrow in Fig. 2, and the weights are hung with their arms inclined in the direction of rotation, so that the inertia effect of the weights will supplement their centrifugal efforts.

The principles governing the action of a governor arranged and coupled together as above described will be understood more clearly by reference to the diagram shown in Fig. 3. In this diagram, A represents the center of rotation of the system, and D the center of suspension of the weight C. As the system revolves the centrifugal force or effort of the weight C at any given position will be in the direction of the line A*a*, passing through the center of rotation and the center of gravity of the weight, and if we lay off on this line, extended, a distance *ab* equal to the unit of centrifugal effort and drop from the point *b* to the radius D*a*, extended, the line *bc* perpendicular thereto, this line will represent the effective component of the centrifugal effort which is expended in rotating the weight C about its center of suspension D, and the ratio of *ab* to *bc* will represent the ratio of the actual centrifugal effort at any position of the weight C to its effective component at that position. As the centrifugal effort at a given speed of rotation can be readily calculated for any position of the weight, this perpendicular, or effective component may also be found for any position, and the force exerted by the weight at the point of attachment of the centripetal spring may be readily calculated, and from this the required initial tension and extension of the spring may be found for any given point of attachment.

As the weight C is revolved about the center D the angle between the radii $D^a$ and $A^a$ will gradually increase until the weight is in the position C′, where the radii become equal, forming an isosceles triangle $AD^{a\prime}$, after which the angle between the radii will again decrease, as shown when the weight is in the position C″. If the lines *ab*, *a′b′*, *a″b″* are laid off equal to a unit of centrifugal effort, then $bc$, $b'c'$, $b''c''$ will represent the effective components of the centrifugal force corresponding to these positions of the weight, and it will be apparent that the ratio of $ab$ to $bc$ will decrease from the position C to C′ and will increase from the position C′ to C″ and that therefore the effective components of the centrifugal effort will increase from the position C to the position C′ and decrease if the weight is allowed to pass beyond the position C′. As it is essential for the operation of my governor that this effective component shall increase as the weight passes from its retracted to its extended positions, it is evident that the parts should be so arranged for the best results that the weight will not pass beyond the position C′. In fact, if C represents the position of the weight at its retracted position, the extended position of the weight, as my governor is arranged, will fall somewhat short of the position C′.

Now if $d$ represents the lever-arm of the centripetal effort of the spring G about the center D, when the weight is in the position C, the diagram furthermore shows that if the weight is revolved to the position C′ the point of attachment F will pass to the position F′, in which position the lever-arm of the spring will be represented by $d'$, from which it becomes apparent that, as the weight passes from its retracted to its extended position, there will be an increase in the moment of the spring, due to its extension, such increase, however, being reduced by the decreasing length of the lever arms, thus causing the moments of the spring to increase by a decreasing increment. It will also be apparent that, by moving the point of attachment of the spring to the hanger H to the right or left, the lever arm of the spring will be decreased or increased, respectively, and the moments of the spring about the center D may therefore be diminished or increased, respectively, so as to bring the spring and weight to the proper degree of correlative adjustment for the proper operation of the governor. The governor may thus be so adjusted that the variation in the speed of the engine shall not exceed one per cent. within the rated capacity of the engine.

If X equals the initial extension of the spring, S equals the scale of the spring, E equals the extension of the spring corresponding to the movement of the weight from retracted to extended position, and $d$ and $d'$ equal the lever-arms of the spring at minimum and maximum extensions, respectively, then $SdX$ equals the moment of the spring at the retracted position of the weight and $Sd'(X+E)$ equals the moment at extended position. $SdX$ must always be less than $Sd'(X+E)$, since, as stated above, the moment of the weight must increase as it moves outward, to attain the best governing. Let $m$ represent the centrifugal moment of the weight at its retracted position and at the assumed speed,—or, in other words, when it is on the point of starting outward under the influence of an increase in speed,—and $m'$ the moment of the weight when it reaches its extreme outward position. If $m'-m$ is made greater than $Sd'(X+E)-SdX$, the decrease in spring moments, as the weight moves inward, will be less rapid than the decrease in the weight moments, and the governor will respond rapidly to changes of load. Whereas, if $m'-m$ is made less than $Sd'(X+E)-SdX$, the governor will be sluggish. This is a most important point in my invention, and is dependent upon the initial tension in connection with the decreasing lever arm of the spring as the weight moves outward, the angle between the line of spring force and the center line of spring lever being always less than 90°. There are, besides the weight and spring moments, other disturbing influences which must be taken into consideration in regulating the governor; such as the centrifugal force of the springs, with the resulting catenary effect; the centrifugal force of the valve connections at the governor; and the inertia and friction of the valve mechanism; all of which must be overcome to meet the shifting loads and speed changes in the engine. Since the algebraic sum of the moments of all these forces affecting the governor must be equal to zero, and the weight and spring moments are the only ones that admit of adjustment, a proper application of the differences between the weight and spring moments, resulting from my arrangement of the governor parts, as above described, may be made to overcome these disturbing influences under change of load or speed to properly maintain this equation of forces and effect quick regulation within prescribed limits without rendering the governor over sensitive.

For the governor, as herein shown and described, I have found that such regulation can be attained by adopting the following formula:

$$(1) \qquad m'-m > Sd'(X+E)-SdX.$$

At the extreme outward position of the weight the centrifugal and spring moments must obviously be equal. Therefore, $Sd'(X+E)=m'$, which gives $$S=\frac{m'}{d'(X+E)}.$$

Substituting this value for S in (1), and solving for X gives:

$$(2) \qquad X > \frac{d'E}{\frac{m'}{m}d-d'}.$$

The usual practice is to make the initial tension sufficient to overcome the resistance of the working parts, disregarding its relation to the extension. To give a quick action and avoid unstable equilibrium I use the formula (2) in determining the initial tension, making the excess, however, as slight as possible to answer the purpose. To provide a spring to which may be given the necessary initial tension and extension to answer these conditions, I have found that the point of spring attachment to the governor arm must be so positioned that the line joining such point of the center of suspension will make an angle with the line joining the centers of suspension and rotation which will always be greater than 90°.

When there is a tendency to a reduction of speed, by reason of increased load, or otherwise, the spring moments decrease less rapidly than the weight moments; and they increase more rapidly than the weight moments when the load is decreased. When the speed changes, the centrifugal moments are modified by the inertia of the weight, which tends to give uniformity of speed. Theoretically, the increase and decrease of spring and weight moments should be the same for isochronous regulation; but, as this would mean unstable equilibrium, the difference in rate of increase or decrease should be made as small as possible, and yet prevent racing. If necessary, this excess may be increased by advancing the point of spring attachment to the rim of the wheel in the direction of rotation—that is to say, to the right in the figures—or decreased by moving it in the opposite direction.

By proportioning and ascertaining the weights, spring tensions, and points of attachment in the manner above described by means of well-known formulas based on the weight and spring moments and equating the centrifugal and centripetal moments so derived to the end that said moments shall be in equilibrium at all times, making, however, due allowance for the frictional resistance of the valve-gear, (and I believe that I am the first to utilize the theory of moments to this end,) I am enabled readily to design a governor for any given engine which will be positive in action for every change of speed and which will be susceptible of much finer adjustment than any governor with which I am acquainted. Moreover, I do away entirely with dash-pots, friction devices, and the like, now made use of in overcoming the oversensitiveness in this type of governor, and I can even do away with the usual governor-stops.

Having thus described my improvements, what I claim as my invention, and desire to secure by Letters Patent, is—

1. A centrifugal governor of the type described comprising a rotatable body, a weight carried by an arm pivoted upon said body at a point eccentric to the center of rotation, said arm being inclined from the line joining the centers of rotation and suspension in the direction of rotation and at an angle thereto which never exceeds ninety degrees, means whereby said arm will actuate the valve gear, and a centripetal spring attached at one end to said body toward the periphery thereof and extending thence to a coupling-pin on the arm, the radius from the center of which pin to the center of suspension makes an angle with the line of spring action which is always less than ninety degrees and an angle with the line joining the centers of rotation and suspension which is always in excess of ninety degrees.

2. A centrifugal governor of the type described comprising a rotatable body, a weight carried by an arm pivoted upon said body at a point eccentric to the center of rotation, said arm being so hung with reference to the direction of rotation that the inertia of the weight will supplement the centrifugal effort of the weight in effecting changes in the position thereof, means whereby said arm will actuate the valve-gear, and a centripetal spring having one end attached to said body toward the periphery thereof and the other end coupled to the weight-arm at a point the radius from which to the center of suspension of said arm makes an angle with the line of spring action which is always less than ninety degrees in any position of the arm and spring and an angle with the line joining the centers of rotation and suspension which is always in excess of ninety degrees.

3. A centrifugal governor of the type described comprising a rotatable body, a weight carried by an arm pivoted upon said body at a point eccentric to the center of rotation, said arm being so hung with reference to the direction of rotation that the inertia of the weight will supplement the centrifugal effort of the weight in effecting changes in the position thereof, means whereby said arm will actuate the valve-gear, and a centripetal spring having one end attached to said body toward the periphery thereof and the other end coupled to the weight-arm at a point the radius from which to the center of suspension of said arm makes an angle with the line of spring action which is always less than ninety degrees in any position of the arm and spring, said spring being given an initial tension and extension such that the moments of the spring efforts with reference to said center of suspension are made to decrease less rapidly than the centrifugal moments of the weight, and said weight-arm being positioned at an angle to the line joining the centers of suspension and rotation such that the components of centrifugal force tending to produce rotation of the weight about said center of suspension are made to decrease, as the load on the engine increases, and vice versa.

4. A centrifugal governor of the type described comprising a rotatable body, a weight carried by an arm pivoted upon said body at a point eccentric to the center of rotation, said arm being so hung with reference to the direction of rotation that the inertia of the weight will supplement the centrifugal effort of the weight in effecting changes in the position thereof, means whereby said arm will actuate the valve-gear, and a centripetal spring having one end attached to said body toward the periphery thereof and the other end coupled to the weight-arm at a point the radius from which to the center of suspension of said arm makes an angle with the line of spring action which is always less than ninety degrees in any position of the arm and spring, said spring being given an initial extension which is approximately equal to, or greater than, the product of the lever-arm of the spring, with reference to said center of suspension at the maximum extension of the spring, into the extension of the spring divided by the difference between the product of the lever-arm of the spring at minimum extension into the ratio of the maximum to minimum centrifugal moments, minus the lever-arm of the spring at maximum extension, and said weight-arm being positioned at an angle to the line joining the centers of suspension and rotation which never exceeds ninety degrees, so that the difference between the moments of the spring efforts at minimum and maximum extension is made approximately equal to, or less than the difference between the combined moments of the centrifugal and inertia efforts of the weight with reference to said center of suspension at the maximum and minimum positions of said weight.

DAVID W. PAYNE.

Witnesses:
FRED. NOLTING,
M. H. CHASE.